J. E. COCHRAN.
COMPUTING SCALE DIAL.
APPLICATION FILED JUNE 17, 1907.
957,934.
Patented May 17, 1910.
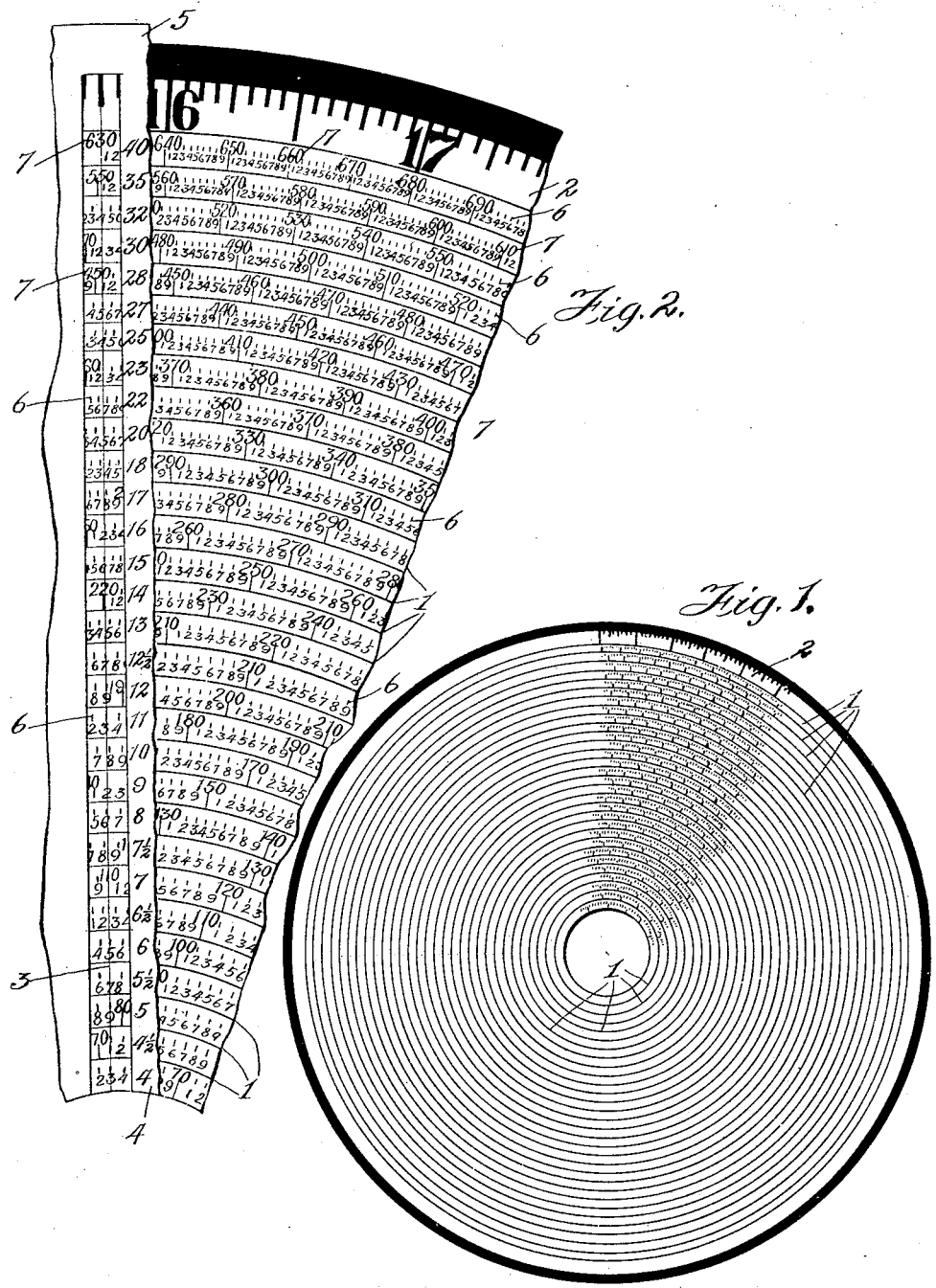

UNITED STATES PATENT OFFICE.

JOSEPH E. COCHRAN, OF ELKHART, INDIANA.

COMPUTING-SCALE DIAL.

957,934.  Specification of Letters Patent.  Patented May 17, 1910.

Application filed June 17, 1907. Serial No. 379,302.

*To all whom it may concern:*

Be it known that I, JOSEPH E. COCHRAN, a citizen of the United States, residing at Elkhart, in the county of Elkhart and State of Indiana, have invented certain new and useful Improvements in Computing-Scale Dials, of which the following is a full, clear, and exact specification.

This invention relates to that class of scale dials used on computing weighing scales in which the dial moves with reference to the pointer, or the pointer with reference to the dial, and the dial bears both the weight and the amount to be charged for that weight at a given price per pound, or fraction thereof, the prices per pound being usually indicated on the pointer or index arranged in a position radial with respect to the dial and the amounts on the dial being indicated by parallel lines registering with the prices on the pointer. For the sake of compactness and keeping the dimensions of dials of this character within feasible bounds, it has been customary to indicate in full, by means of figures, nothing less than ten cents, and of the amounts over ten cents only those constituting a multiple of ten, the intermediate amounts being indicated merely by means of graduations without figures, because it is not feasible to number these, and also to have in the same lateral row from two to five figures necessary for denoting the successive multiples of ten, it being obvious that the figures of the latter or else the figures of the intermediate amounts would be so minute as to be illegible. Consequently, with computing scale dials possessing any considerable range of prices and weights it has heretofore been necessary to observe the position of the index or pointer very closely and to count the intermediate graduations in order to determine the exact amount indicated. The necessity for this often induces the salesman to guess at the amount, and such practice is attended, of course, by mistakes and loss to either the vender or the vendee.

This invention is designed to overcome these difficulties and has for its primary object to provide an arrangement of the characters or figures which will make it feasible to indicate each cent graduation by a figure of legible size, and to also indicate the amounts comprising the multiples of ten in full by figures of liberal dimensions while keeping the dimensions of the dial within reasonable bounds.

With a view to the attainment of these ends and the accomplishment of other new and useful objects which will hereinafter appear, the invention consists in the features of novelty which will now be described with reference to the accompanying drawings and more particularly pointed out in the claims.

In the said drawings—Figure 1 is a face view of a computing scale dial having the rows of graduations which indicate the amounts arranged concentrically, but in this small view it has not been feasible to indicate by figures what the graduations stand for. Fig. 2 is an enlarged segment of the dial shown in Fig. 1, also illustrating the index or pointer.

In this exemplification of the invention the dial is represented with its graduations indicating the amounts in money in concentric circles 1 and the graduations 2 indicating the weight in a marginal or peripheral line encompassing the aforesaid circles. The index or pointer in this illustration is indicated by a line 3 which is arranged in radial relation to the dial and which may be constituted by a wire or cord, or by a line cut or formed directly upon the glass or transparent section 4 set in the casing 5 which incloses the dial and upon which glass or transparent member the price per pound, or fraction thereof may be indicated. In this example, the prices range from four to forty cents, as shown in Fig. 2.

Each of the concentric circles 1 is laid off as heretofore by graduations or dots 6, each indicating one cent, or a fraction or multiple thereof, or any other desired monetary amount. In this example, however, the graduations each represent one cent. As before stated, it has heretofore been customary to number in full by means of figures nothing less than the graduations indicating ten cents, and of the amounts over ten cents only those constituting a multiple of ten, while the intermediate amounts were denoted only by the graduation marks 6. It is also probably true that in some instances on small scales where there was sufficient room for the purpose, even smaller amounts were indicated in full, but it may be stated as a general rule that in large scales having a wide range of prices and weight, the larger amounts could not be indicated in full at every graduation, because of the lack of room in the concentric circles or lines for both the cent figures and the figures constituting multiples of ten. According to this invention, however, it will be seen that the value of each graduation 6 is denoted by a numeral, these numerals being repeated successively around each concentric series of graduations from 1 to 9, and these being applied to the intermediate graduations indicating 1 to 9 respectively, while the tenth graduation in each line or circle, which stands for ten cents or a multiple of ten cents, is also indicated in full by a number, as at 7. The graduation mark which stands for the full number is arranged close to the circle and in line with the numerals which indicate the cents, while the number 7, indicating a multiple of ten, is set above or offset from the concentric line of cent numerals so that the numbers constituting the multiples of ten may be indicated in full by numerals of liberal size without crowding, over-lapping, or otherwise confusing the cent numerals, which may also be of liberal dimensions and capable of being easily read in connection with the numbers above. It is also seen that each of the cent numerals is indicated by one of the graduation marks 6 so that the position of the index 3 with relation to the positions of the cent numerals may be accurately determined in cases where it is necessary or desirable to take into account the fraction of a cent. These graduations 6, however, are arranged above the cent numerals and in the same concentric line as the numerals 7 indicating the multiples of ten. In order to still further guard against confusion in reading the dial, the numerals indicating the full amounts or multiples of ten may be printed or produced in a color distinct from that of the other numerals, as for example, the latter may be black and the former red.

In the use of a dial thus constructed, it will be seen that in computing the amount to be charged for a certain weight at a given price, it is simply necessary to observe the numeral which is crossed by the index line 3 at the point opposite the price on the surface 4, and to add this numeral to the full number 7 on the left, which will be the amount to be charged for the goods on the pan or platform at that price per pound. For example, if the price per pound is forty cents, and the index line 3 crosses the graduation 7 between the full numbers 670 and 680, then it would be instantly apparent that the amount to be charged would be 670 plus 7, or $6.77, whereas, if the intermediate graduation 6 were not thus numbered, it would be necessary to very closely observe the position of the index line 3 and then count the graduation 6 lying between 670 and the index line. As these graduations 6 are very close together in the lines opposite the larger prices, it is both tedious and difficult to thus compute the amount, and even where care is taken, mistakes are liable to occur, and as before said, it is so tedious as to induce the salesman to guess at the amount and thereby often make mistakes, which subject either the vender or the vendee to financial loss.

Claims.

1. As a new and useful article of manufacture a computing scale dial having a plurality of concentric lines, concentric rows of graduations indicated between said lines, every tenth one of said graduations bearing a number constituting a multiple of ten, and each of the nine graduations following each tenth graduation being numbered from 1 to 9 consecutively throughout the concentric row, the said numbers constituting multiples of ten and being arranged in a concentric row contiguous to one of said lines and the other said numerals being arranged in a concentric row contiguous to the opposite one of said lines, both rows of numerals being between the same two lines and extending on opposite sides of the graduations to offset one row from the other.

2. As a new and useful article of manufacture a computing scale dial having a plurality of concentric rows of graduations, every tenth graduation being offset from the nine succeeding graduations so as to be in a different concentric row and every tenth graduation being numbered by a number constituting a multiple of ten and said number being arranged in a concentric row with the first nine of said graduations and each of the first nine of said graduations being consecutively numbered from 1 to 9, and said numbers of from 1 to 9 being arranged in a concentric row in line with each tenth graduation so that the two sets of numbers and the two sets of graduations will be in concentric rows offset from each other with the numbers on opposite sides of the respective series of graduations.

3. As a new and useful article of manufacture a computing scale dial having a plurality of concentric lines and each space between said lines bearing numerals arranged in arithmetical progression from 1 to 9 in a row concentric with said lines and adjacent one of the lines, the point between each numeral 9 and each numeral 1 throughout said concentric row being numbered by a number constituting a multiple of ten and the latter said number being offset in said space between the lines to a position outside of the concentric row of the first said numerals and adjacent the other concentric line, the first said numerals being indicated in a color distinguishable from the color of the said numbers constituting multiples of ten.

4. As a new and useful article of manufacture, a computing scale dial having a plurality of concentric lines, a row of graduations between each two lines, every tenth one of said graduations extending to one side of the intermediate nine graduations, all of the graduations excepting every tenth graduation being numbered in consecutive series from 1 to 9, the numbers being arranged on one side of the respective graduations and concentric with the row of graduations, the tenth graduations extending to the same side of the rows of graduations on which the said series of numbers are located and being arranged in the line of said numbers, each of said tenth graduations having an indicating character or number arranged in row with the intermediate nine graduations and extending on the side of the first said row of graduations opposite to the side on which said series of numbers from 1 to 9 are located.

5. As a new and useful article of manufacture, a computing scale dial having a plurality of concentric lines and each space between said lines bearing numerals arranged in arithmetical progression from 1 to 9 in a row concentric with the said lines and adjacent one of said lines, graduations extending between each numeral 9 and each numeral 1 throughout said concentric row, said graduations being numbered by a number constituting a multiple of 10 and the latter said numbers being offset in said space to a position to one side of the concentric row of the first said numerals and adjacent the other of said concentric lines, the first said numerals having a distinguishing characteristic from the numbers constituting the multiples of 10.

6. As a new and useful article of manufacture, a computing scale dial having a plurality of concentric lines and each space between said lines bearing numerals arranged in arithmetical progression from 1 to 9 in a row concentric with the said lines and adjacent one of said lines, graduations extending between each numeral 9 and each numeral 1 throughout said concentric row, said graduations being numbered by a number constituting a multiple of 10 and the latter said numbers being offset in said space to a position to one side of the concentric row of the first said numerals and adjacent the other of said lines, the first said numerals having a distinguishing characteristic from the numbers constituting the multiples of 10, a marginal row of graduations on the dial spaced to indicate weight, and a series of numbers arranged at every whole pound and representing a whole pound.

In testimony whereof I have signed my name to this specification, in the presence of two subscribing witnesses, on this 15th day of June, A. D. 1907.

J. E. COCHRAN.

Witnesses:
CHAS. H. SEEM,
FRANCIS A. HOPKINS.